United States Patent [19]

Flentge

[11] E Re. 28,499

[45] Reissued July 29, 1975

[54] POWER PACK

[75] Inventor: Robert W. Flentge, Roselle, Ill.

[73] Assignee: A. F. Dormeyer Mfg. Co., Inc., Chicago, Ill.

[22] Filed: Mar. 15, 1974

[21] Appl. No.: 451,517

Related U.S. Patent Documents

Reissue of:

[64] Patent No.: 3,711,806
Issued: Jan. 16, 1973
Appl. No.: 215,023
Filed: Jan. 3, 1972

[52] U.S. Cl. ..... 336/92; 336/107; 336/192; 336/198

[51] Int. Cl. ..... H01f 27/02

[58] Field of Search ..... 336/92, 105, 107, 192, 336/198; 321/8; 320/2; 367/150

[56] References Cited

UNITED STATES PATENTS

| | | | |
|---|---|---|---|
| 2,583,353 | 1/1952 | Bishofberger | 336/107 X |
| 2,922,932 | 1/1960 | Glowacki et al. | 336/192 X |
| 3,189,772 | 6/1965 | Wingler et al. | 336/198 X |
| 3,230,490 | 1/1966 | Johnson | 336/198 |
| 3,237,079 | 2/1966 | Mas | 336/107 X |
| 3,255,399 | 6/1966 | Parks | 321/8 R |
| 3,371,302 | 2/1968 | Mas | 336/92 |
| 3,387,244 | 6/1968 | Davis | 336/107 X |
| 3,403,366 | 9/1968 | Klatte et al. | 336/107 X |

*Primary Examiner*—Thomas J. Kozma
*Attorney, Agent, or Firm*—Lockwood, Kewey, Zickert & Alex

[57] ABSTRACT

A power pack unit for reducing line voltage and changing frequency including a transformer having a molded bobbin of insulating material and an enclosure casing where the bobbin includes insulating flanges integrally formed to insulate the transformer core from the winding terminals and channels for receiving primary and secondary terminals that can be located in place and as a subassembly mounted into a casing made of two parts which are suitably fastened together.

16 Claims, 18 Drawing Figures

POWER PACK

Matter enclosed in heavy brackets [ ] appears in the original patent but forms no part of this reissue specification; matter printed in italics indicates the additions made by reissue.

---

This invention relates in general to a power pack for reducing line voltage and for providing alternating current, direct current or battery charger operation, and more particularly to a power pack that is uniquely constructed to enable it to be inexpensively manufactured while at the same time meeting the stringent requirements of Underwirters' Laboratories approval.

The use of power packs is becoming more popular for small appliances where it is desired to operate the appliance at a voltage substantially lower than line voltage or by battery. For example, power packs for small appliances are presently being marketed where the 110 volt AC line voltage is reduced to 12 volts and rectified to provide DC voltage. Another example of power pack usage is where nickel cadmium batteries are employed for powering small appliances and a need to recharge the batteries from time to time requires the use of a line voltage operated battery charger power pack. The reduction of voltage to a lower level by use of a power pack is significant to assist in obtaining Underwriters' Laboratories approval on appliances.

While domestically made power packs are presently available, their cost is too high to complete with foreign-made units. The main reasons of high cost reside in labor costs caused by taping, staking, gluing and potting operations necessitated to provide a power pack unit that will meet Underwriters' Laboratories approval.

The power pack of the present invention is unique in that it eliminates the above-mentioned costly operations, and provides an assembly that can be quickly and easily put together and which will ultimately pass Underwriters' Laboratories tests. While the power pack of the invention merely includes the well known transformer in a casing, it is unique in the construction of the bobbin and the casing to facilitate ease of assembly and to eliminate certain procedures which are costly, while at the same time satisfying the rigorous standards of Underwriters' Laboratories. In this respect the bobbin is initially formed to eliminate certain heretofore necessary taping operations. Further, the terminals are mounted and associated with the bobbin in such a way as to eliminate staking or gluing operations. Finally, the transformer assembly is enclosed with a housing to eliminate potting and gluing operations, and the housing is constructed to permit assembly by use of sonic welding, gluing or riveting. The power pack circuitry may be such as to reduce line voltage, charge batteries, or change input frequency from 60 Hz. to DC or pulsating DC.

It is therefore an object of the present invention to provide a new and improved power pack for alternating current, direct current, or battery charger applications which is simple in construction and inexpensive to assemble, while at the same time satisfying Underwriters' Laboratories requirements.

Another object of this invention is in the provision of a power pack that can be easily and inexpensively assembled in a case without the need for taping, staking, gluing or potting operations.

Other objects, features and advantages of the invention will be apparent from the following detailed disclosure, taken in conjunction with the accompanying sheet of drawings, wherein like reference numerals refer to like parts, in which.

Figure 2:
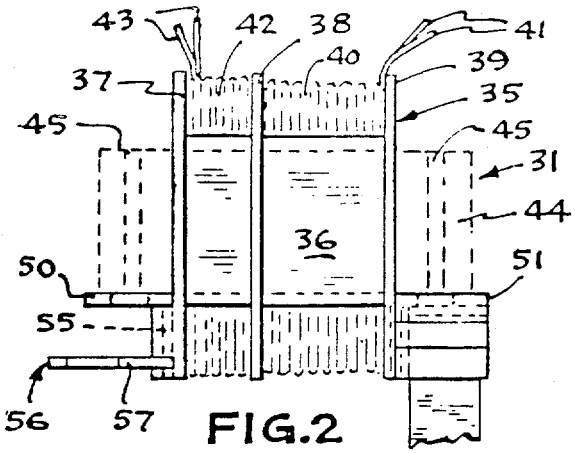
FIG. 2 is a side elevational view of the transformer subassembly for the power pack and illustrating particularly the transformer bobbin.
Figure 1:
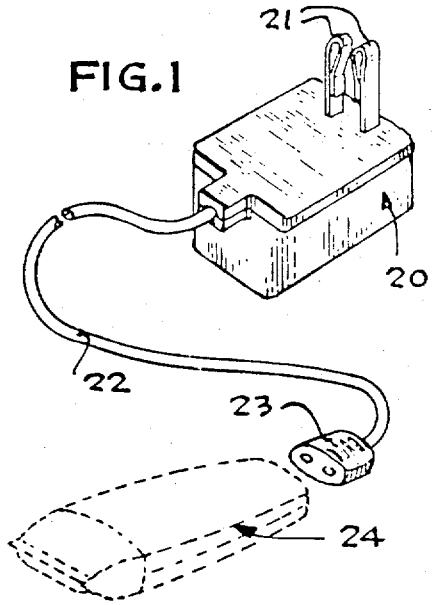
FIG. 1 is a perspective view of the power pack according to the invention and illustrating in phantom a hair clipper that may be connected to and operated by the power pack as one example of usage.
Figure 3:
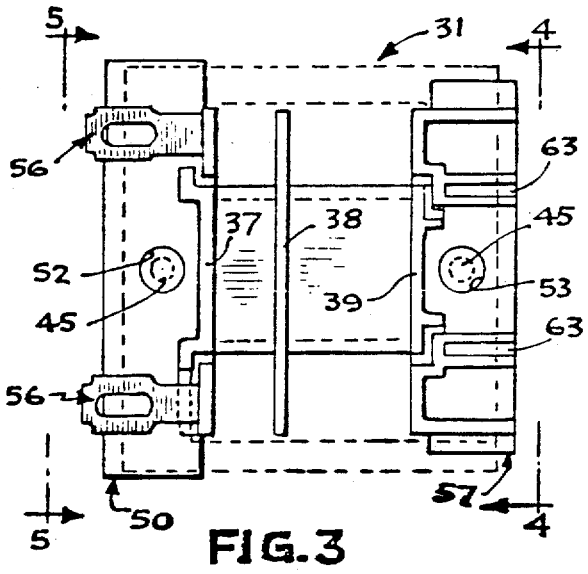
FIG. 3 is a bottom plan view of the transformer subassembly of FIG. 2 with the primary terminals omitted for purposes of clarity.

Referring now to the drawings and particularly to FIG. 1, the power pack of the invention, generally designated by the numeral 20, is illustrated as having primary terminals 21 adapted to be insertable in a standard electrical wall outlet, and a secondary cord 22 having a plug 23 adapted to engage terminals of a small electrical appliance such as a hair clipper 24 which is shown in phantom. The power pack, when used for an electrical appliance functions to reduce the wall outlet voltage to a lower voltage which eliminates the possibility of incurring dangerous electrical shock from the appliance. For example, where the wall outlet voltage would be 110 volts AC, the voltage preferably is reduced to about 12 volts. Additionally, the voltage may remain as alternating current voltage or be rectified to provide direct current voltage. It should further be appreciated that the power pack may be constructed to charge a battery, such as a rechargeable nickel cadmium battery.

Figure 6:
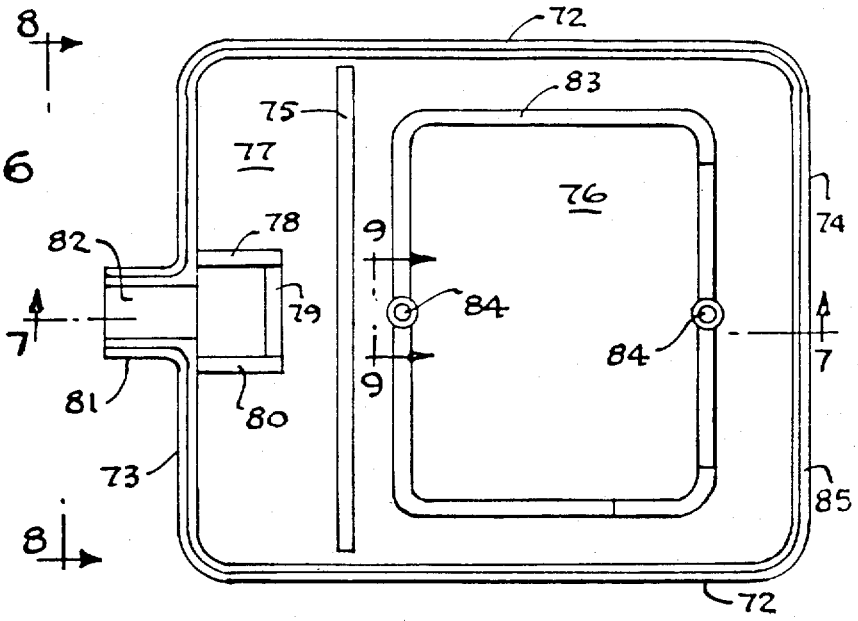
FIG. 6 is a top plan view of the power pack case into which the transformer subassembly is placed.
Figure 7:
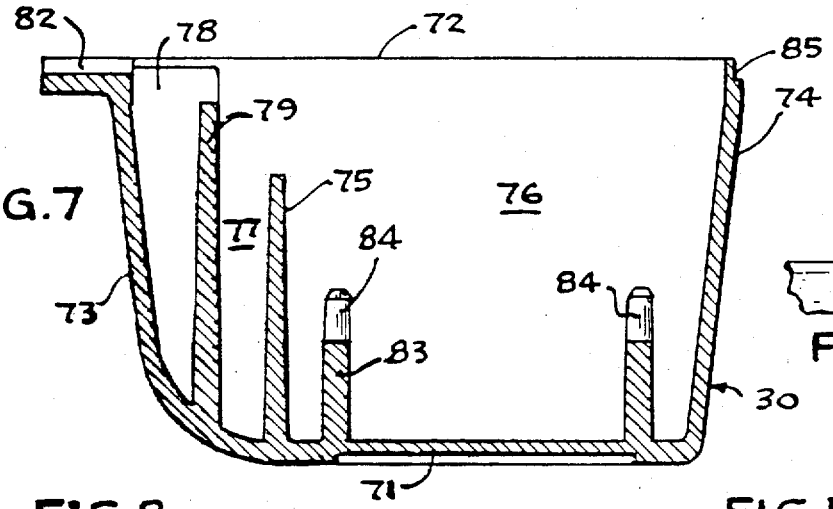
FIG. 7 is a vertical sectional view taken substantially along line 7—7 of FIG. 6.
Figure 9:
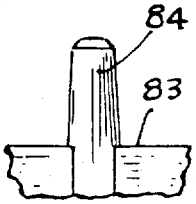
FIG. 9 is an enlarged detail elevational view of a transformer locating pin in the power pack case and looking generally along line 9—9 of FIG. 6.
Figure 8:
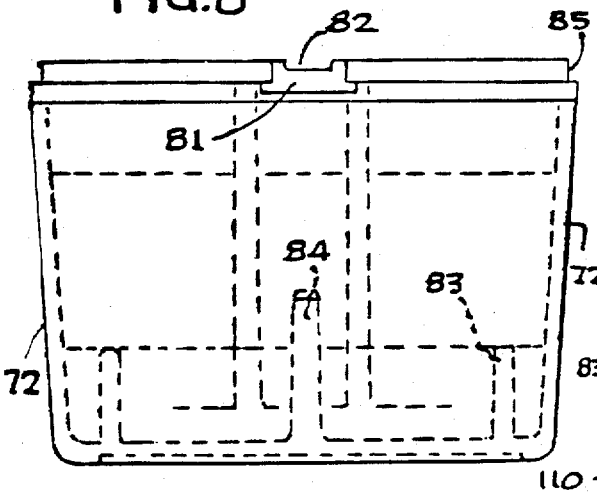
FIG. 8 is an end elevational view of the power pack case looking generally along line 8—8 of FIG. 6.

The invention relates to the power pack construction where a molded electrical insulating plastic case and cover encloses a transformer subassembly. The case, generally indicated by the numeral 30, FIGS. 6–8, after having the transformer subassembly 31, FIGS. 2–5 and 14, inserted therein, is closed by the cover 32 which is welded, glued, riveted, or otherwise secured to the case. Because of the structure of the transformer bobbin and the cover, taping, staking, gluing and encapsulating are eliminated, thereby greatly reducing the overall cost of the power pack.

The transformer subassemblly includes a bobbin 35 molded of a suitable electrical insulating plastic, such as nylon, Delrin or the like. The bobbin supports the transformer windings, the transformer core, secondary terminals and primary terminals.

As seen particularly in FIGS. 2–5, the bobbin includes a hollow rectangular in cross section body 36 having winding flanges 37, 38 and 39. The primary winding 40 is wound between flanges 38 and 39 and terminates in primary leads 41, while the secondary winding 42 is wound between the flanges 37 and 38 and terminates in secondary leads 43. A laminated frame or core 44, shown in phantom in FIGS. 2–5, surrounds the bobbin and the windings and also extends through the center of the bobbin body 36 to magnetically couple the windings, and is provided with pin locating holes 45 to facilitate the mounting of the transformer in the case and cover and thereby inhibit movement therein.

Insulating flanges 50 and 51 are integrally formed on the bobbin and extend from opposite ends parallel to the iron core 44 and extend along one side of the iron core ends to insulate the iron core from the lugs and terminals, thereby eliminating the need to apply insulating taping or other insulating material to the subassembly. Holes 52 and 53 are formed in the flanges 50 and 51, respectively, to align with the pin locating holes 45 of the laminations so that locating pins can extend into the pin locating holes of the core from the flange side of the laminations.

The winding flange 37 is of increased thickness at the lower side and also includes lug sockets for receiving anchoring ends 55 of secondary lugs 56. The lugs are provided with lead connecting tabs 57, to which the secondary winding leads 43 and the secondary cord leads are attached, such as by soldering prior to insertion of the transformer subassembly into the case 30. Accordingly, the lugs 56 are of a suitable electrical conducting metal and serve to couple the secondary winding leads to the secondary cord leads.

The primary terminals 21 include prongs 60 which engage in a wall outlet, anchoring portions 61 extending at right angles to the prongs, and soldering tabs 62 extending at right angles from the prongs and onto which the primary leads of the primary winding may be soldered. Channels 63 are formed in the bobbin 35 for receiving the anchoring portions and a part of the prongs of the primary terminals when the primary terminals are mounted on the bobbin. Each channel 63 includes a section 63a into which the anchoring portion 61 of the terminals is inserted, and a section 63b extending at right angles to the section 63a and into and through which the prongs 60 are inserted. The channel section 63a is defined by the rear wall 64 and a front wall 65. The rear wall 64 is a part of the insulating flange 51 which insulates the terminals from the laminations 44. Openings 66 are defined in the bobbin for receiving the soldering tabs 62 and providing room so that the primary leads of the primary winding may be wound around the tabs and soldered thereto. As will be more clearly explained hereafter, when the transformer subassembly is assembled with the case and cover, the front wall 65 is forced toward the back wall 64 so as to frictionally grip the terminal anchor portions 61 and hold the terminals against undesirable movement when they are being inserted into and withdrawn from a wall plug. It is not necessary to stake the terminals in any fashion when mounting and securing them in place on the bobbin and within the case and cover.

Figure 14:
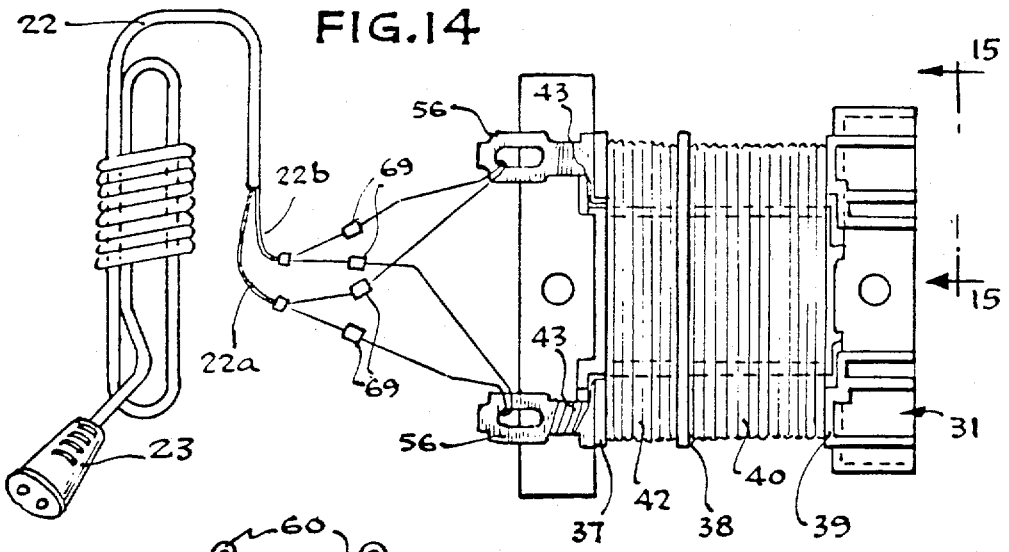
FIG. 14 is a somewhat diagrammatic view of the trans-former subassembly which is to be mounted in the power pack case.

The transformer subassembly illustrated in FIG. 14 which is essentially ready to be mounted into a case and cover subassembly includes a plurality of diodes 69 connected between the secondary lugs 56 and the secondary leads 22a and 22b of the secondary cord 22 to provide four-way rectification of the AC output from the secondary winding of the transformer. It should be appreciated that if it was desired only to step down the AC voltage, the rectifying diodes 69 would not be needed. Likewise, the transformer circuitry may be otherwise revised as required.

The case 30 includes a bottom wall 71, opposite upstanding side walls 72, and front and back walls 73 and 74. In order to facilitate molding procedures, all of the walls have some taper outwardly toward the upper open end. A partition wall 75 extends between the opposite side walls and adjacent the front wall 73 to define a transformer chamber 76 and a diode chamber 77. Within the diode chamber 77 upstanding walls 78, 79 and 80 coact with the front wall 73 to provide a cord strain relief section. At the upper end of the front wall 73 a short extension 81 is provided and which defines a cord groove 82 through which extends the secondary cord.

Figure 16:
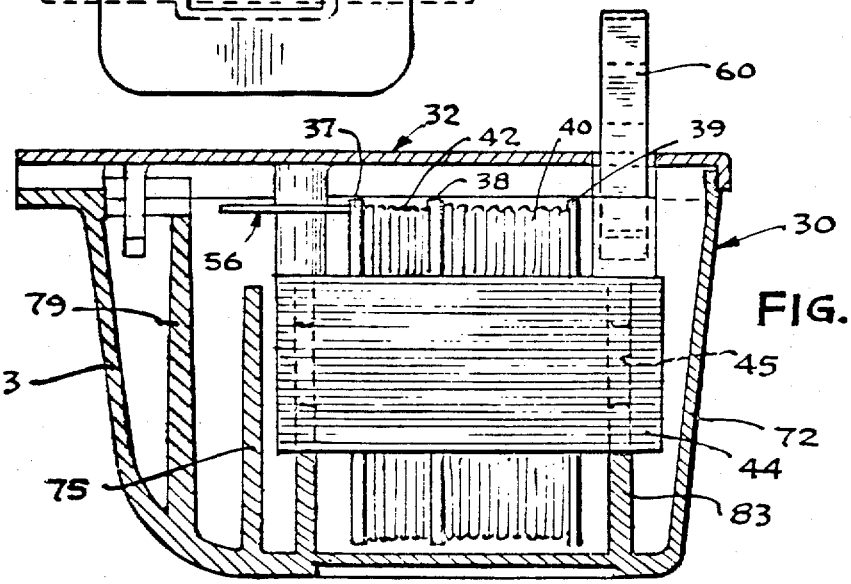
FIG. 16 is a vertical sectional view taken through the power pack case and illustrating the transformer subassembly in place within the case but omitting the line cord.

Within the transformer chamber 76 a rectangular upstanding supporting ridge 83 forms the bottom *for* [of] the laminations which support the bobbin and windings within the case as shown in FIG. 16. Locating pins 84 are formed on the ridge 83 and adapted to receive the locating holes 45 of the laminations so as to properly locate the transformer subassembly within the case 30 as illustrated in FIG. 16. Following the mounting of the transformer subassembly within the case 30, the cover 32 may then be mounted in place. To facilitate mounting the cover on the case, a peripheral notch 85 is formed along the upper outer periphery of the upstanding walls.

The cover 32 is essentially flat and provided with a peripheral skirt 90 which coacts with the peripheral notch 85 of the case during assembly of the cover onto the case. Primary terminal prong openings 91 are provided in the cover and through which the primary terminal prongs 60 extend. Transformer locating pins 92 are provided on the cover for engaging in the locating holes 45 of the transformer laminations. Shoulders 93 are defined with the pins 92 for bottoming on the laminations and for maintaining the transformer subassembly in tightly arranged relationship within the case and cover when the cover has been secured onto the case. A strain relief lug 94 extends from the cover to coact with the walls 78, 79 and 80 and fully define the cord strain relief.

Figure 4:
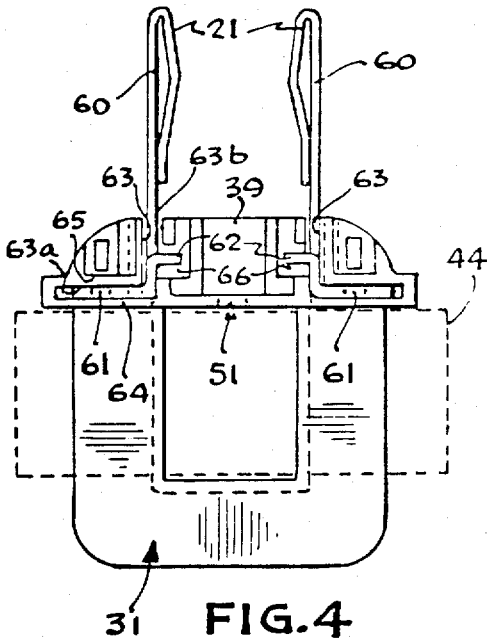
FIG. 4 is an end elevational view of the transformer subassembly of FIG. 3 and looking in the direction of the arrows 4—4 of FIG. 3.
Figure 5:
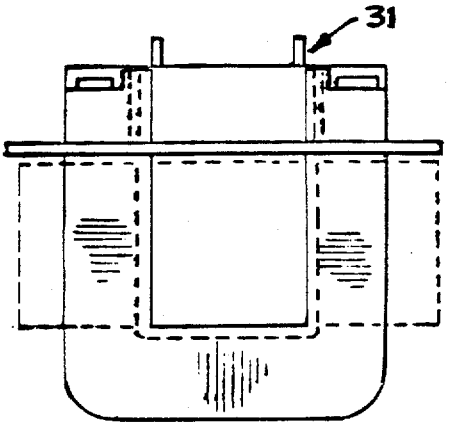
FIG. 5 is an end elevational view of the transformer subassembly and looking in the direction of the arrows 5—5 of FIG. 3.

A pair of terminal locking pins or pressure pins 96 extend from the cover 32 for abutting the walls 65, FIG. 4, to drive the walls 65 toward the walls 64 and lock the primary terminal anchoring portions firmly in place and also enable the terminals to sustain a sufficient amount of pull so that the power pack can pass Underwriters' Laboratories approval. A short extension 97 extends from one end of the cover and includes a cord groove 98 to coact with the cord groove 82 on the case and define a cord hole for the secondary cord. The cover is preferably secured to the case by sonic welding. However, it may be secured in place by gluing, or by riveting as hereinafter described.

Figure 17:
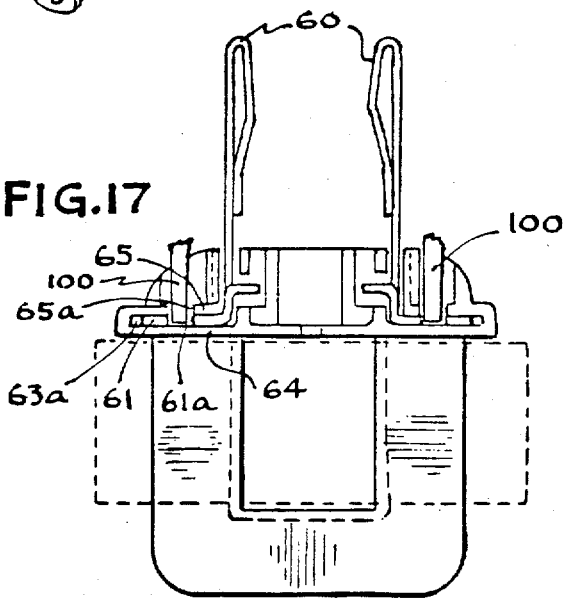
FIG. 17 is a view similar to FIG. 4 but illustrating a modified form of locking pins for locking the terminals in place on the bobbin.
Figure 15:
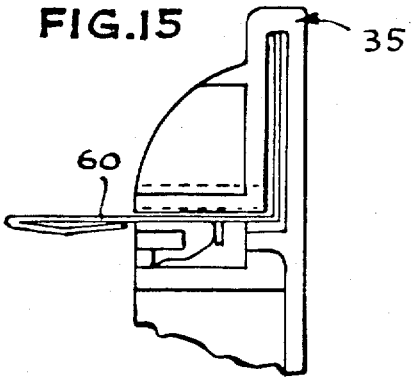
FIG. 15 is an enlarged detail view taken along line 15—15 of FIG. 14.

An alternate form of locking the primary terminals in place on the bobbin is shown in FIG. 17, wherein the pressure or locking pins 100 extending from the cover are slightly longer than the pins 96 and are formed to pass through holes 65a formed in the walls 65 and holes 61a formed in the terminal locating pins 61. The pins 100 seat against the wall 64 which coacts with wall 65 to form the channel 63a.

Figure 18:
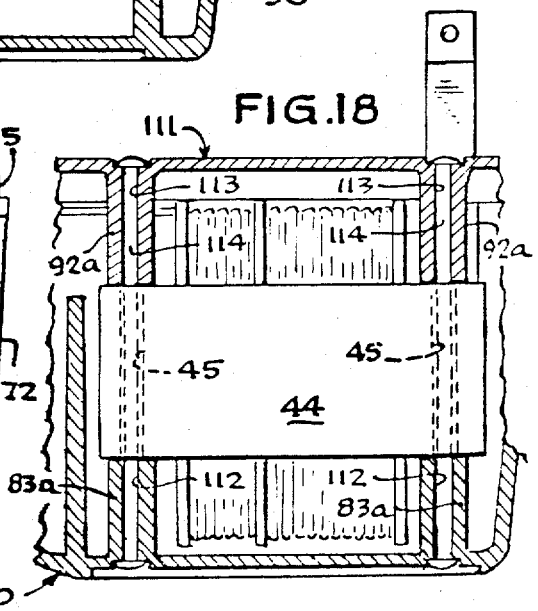
FIG. 18 is a longitudinal sectional view of a modification where the cover is riveted to the case.
Figure 10:
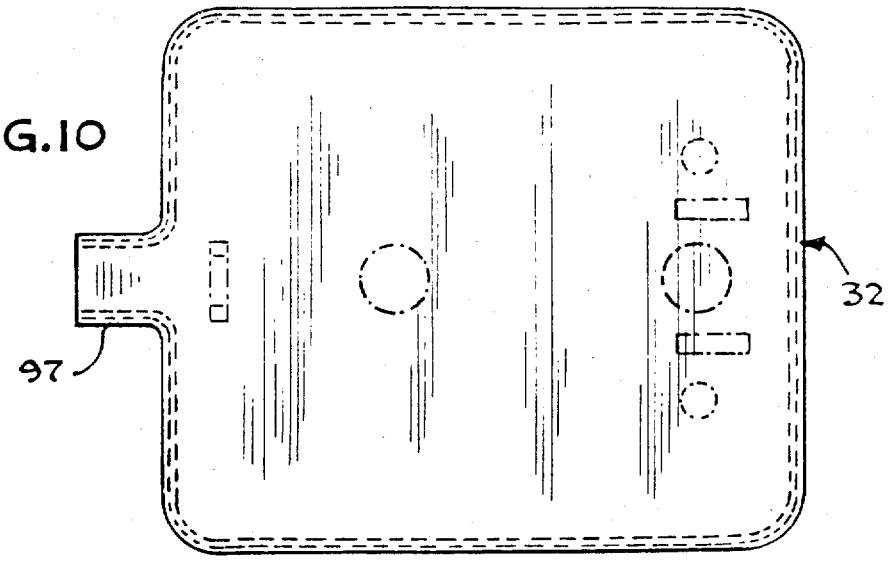
FIG. 10 is a top plan view of the cover for the power pack case.
Figure 11:
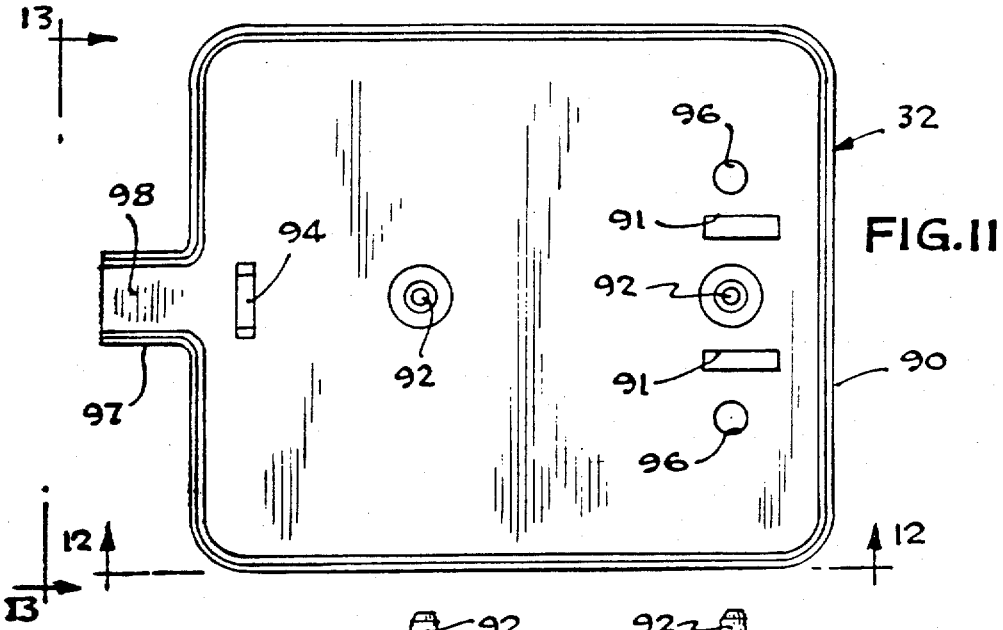
FIG. 11 is a bottom plan view of the cover.
Figure 12:
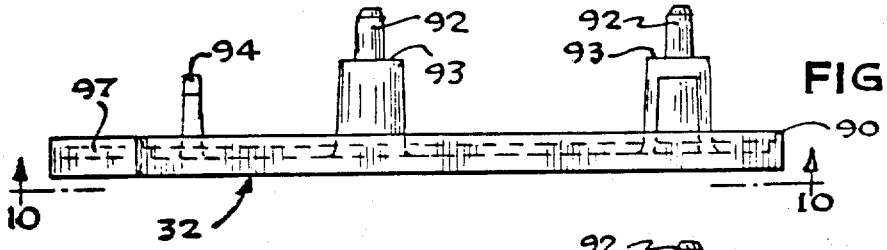
FIG. 12 is a side elevational view of the cover looking in the direction of the arrows 12—12 of FIG. 11.
Figure 13:
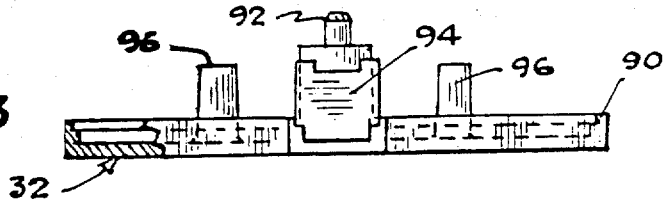
FIG. 13 is an end elevational view of the cover and looking in the direction of the arrows of line 13—13 of FIG. 11.

The embodiment of FIG. 18 differs from the other embodiments in that it illustrates how the cover member may be riveted to the case. The case is generally identified by the numeral 110, while the cover is generally identified by the numeral 111. The case 110 differs in construction from the case 30 in that the locking pins 84 of case 30 are omitted and rivet holes 112 are formed in the upstanding supporting ridge 83a to align with the locating holes 45 of the transformer core 44 when the transformer subassembly is positioned within the case. Similarly, the locating pins 92 on the cover member 32 are omitted and the cover 111 is provided with rivet holes 113 in the pin bases 92a which align with the locating holes 45 of the transformer frame 44 when the cover is in place on the case. Rivets 114 then extend through the rivet holes and transformer core locating holes. The rivets are provided with heads on one end and then rolled over at the other end to lock the cover on the case. Recesses are provided in both the cover and case so that the rivet heads and rivet rollover portions are recessed below the cover and case surfaces.

It will be understood that modifications and variations may be effected without departing from the scope of the novel concepts of the present invention, but it is understood that this application is to be limited only by the scope of the appended claims.

The invention is hereby claimed as follows:

1. A power pack for use with a small electrical appliance to to reduce line voltage and provide a low operating voltage, said power pack comprising a transformer subassembly enclosed within a case and cover assembly from which project primary terminals for plugging into a wall outlet and a secondary line cord or terminals for connection to the appliance, said transformer subassembly including a bobbin molded for electrical insulating material, primary and secondary windings on the bobbin, secondary soldering lugs anchored to the bobbin and connected to the secondary winding and the secondary line cord, primary terminals carried in channels formed in the bobbin connected to the primary winding, a laminated iron core fastened to the bobbin and surrounding the windings, insulating flanges integrally formed on the bobbin for insulating the laminated core from the primary terminals and the secondary lugs, locating holes in said laminated core, said case and cover assembly including transformer locating pins for engaging said laminated core locating holes to orient the transformer subassembly within the case and cover assembly, said cover including openings for the primary terminals to project therethrough, and means on the cover coacting with the bobbin to lock the terminals in the channels and inhibit movement thereof.

2. The combination as defined in claim 1, wherein support means within the case and on the cover coact with the locating pins to prevent movement of the transformer subassembly relative the casing.

3. The combination as defined in claim 2, wherein said primary terminals include prongs that engage the wall outlet and anchor portions extending at right angles to the prongs for anchoring the terminals in the channels.

4. The combination as defined in claim 1, wherein said cover means includes primary terminal locking pins engaging the bobbin at the primary terminals tc squeeze the channels in which the primary terminals are located.

5. The combination as defined in claim 1, wherein said cover means includes primary terminal locking pins engaging the bobbin and the terminals to lock the terminals to the bobbin.

6. The combination as defined in claim 1, wherein said channels are defined by opposed walls and said terminal locking means including primary terminal locking pins such that when the cover is in closed position relative the case said locking pins engage one of the channel walls to move it toward the other channel wall and frictionally grip the terminals therein.

7. The combination as defined in claim 1, wherein the cover is sonically welded to the case.

8. The combination as defined in claim 1, wherein the cover is glued to the case.

9. The combination as defined in claim 3, wherein the cover is sonically welded to the case.

10. The combination as defined in claim 3, wherein said channels are defined by opposed front and back walls, said front wall and said terminal anchor portion having aligned holes, and said terminal locking means including primary terminal locking pins such that when the cover is in closed position relative the case said locking pins enter the holes of said channel walls and anchor portions to lock the terminals in place on the bobbin.

11. A power pack for use with a small electrical appliance to reduce line voltage and provide a low operating voltage, said power pack comprising a transformer subassembly enclosed within a case and cover assembly from which project primary terminals for plugging into a wall outlet and a secondary line cord or terminals for connection to the appliance, said transformer subassembly including a bobbin molded of electrical insulating material, primary and secondary windings on the bobbin, secondary soldering lugs anchored to the bobbin and connected to the secondary winding and the secondary line cord, primary terminals carried in channels formed in the bobbin connected to the primary winding, a laminated iron core fastened to the bobbin and surrounding the windings, insulating flanges integrally formed on the bobbin for insulating the laminated core from the primary terminals and the secondary lugs, locating holes in said laminated core, said case and cover assembly including means coacting with said laminated core locating holes to orient the subassembly within the case and cover assembly, said cover including openings for the primary terminals to project therethrough, and means on the cover coacting with the bobbin to lock the terminals in the channels and inhibit movement thereof.

12. The combination as defined in claim 11, wherein said subassembly orienting means includes locating pins extending from the case and cover.

13. The combination as defined in claim 11, wherein said subassembly orienting means includes rivets extending through said case and cover and which also locks the cover and case together.

14. The combination as defined in claim 11, wherein said subassembly orienting means includes rivet holes in the case and cover, and rivets extending through the holes and the laminated core locating holes to orient the subassembly and lock the cover and case together.

*15. A power pack for use with a small electrical appliance to reduce line voltage and provide a low operating voltage, said power pack comprising a case and cover assembly and a transformer subassembly enclosed within the case and cover assembly, said transformer subassemby including a one-piece bobbin molded of electrical insulating materials having a body and a plurality of winding and electrical insulating flanges, primary and secondary windings on the bobbin body within the winding flanges, a laminated iron core fastened to the bobbin and surrounding the windings, secondary soldering lugs, one of said winding flanges including means receiving and anchoring said secondary soldering lugs to the bobbin, a secondary line cord, means connecting said secondary line cord and said secondary winding to said lugs, opening means in the case and cover assembly through which said cord projects, one of said electrical insulating flanges insulating the secondary lugs from the laminated core, primary terminals having prongs extending through opening means in the case and cover assembly for engaging in an electrical outlet and anchoring portions within the case and cover assembly extending substantially at right angles to the prongs, another of said electrical insulating flanges, having L-shaped channels receiving said anchoring portions and a part of said prongs of the primary terminals and insulating said primary terminals from the laminated core, each said channel including a first portion coextensive with the primary terminal prong and receiving part of said prong and a second portion at right angles to the first portion receiving the primary terminal anchoring portion whereby pull forces exerted on the prong during disengagement of same from an electrical outlet are transmitted through said anchoring portion of the primary terminal and second portion of the channel to the bobbin of the transformer subassembly, means on the transformer subassembly coacting with means on the case and cover assembly to orient the subassembly within the case and cover assembly, and means on the case and cover assembly coacting with the bobbin to lock the primary terminals in the channels and inhibit movement thereof.*

*16. The power pack defined in claim 15, wherein the primary terminals are oriented relative the laminated core such that the prongs extend substantially at right angles to the core.*

* * * * *